United States Patent Office 3,118,823
Patented Jan. 21, 1964

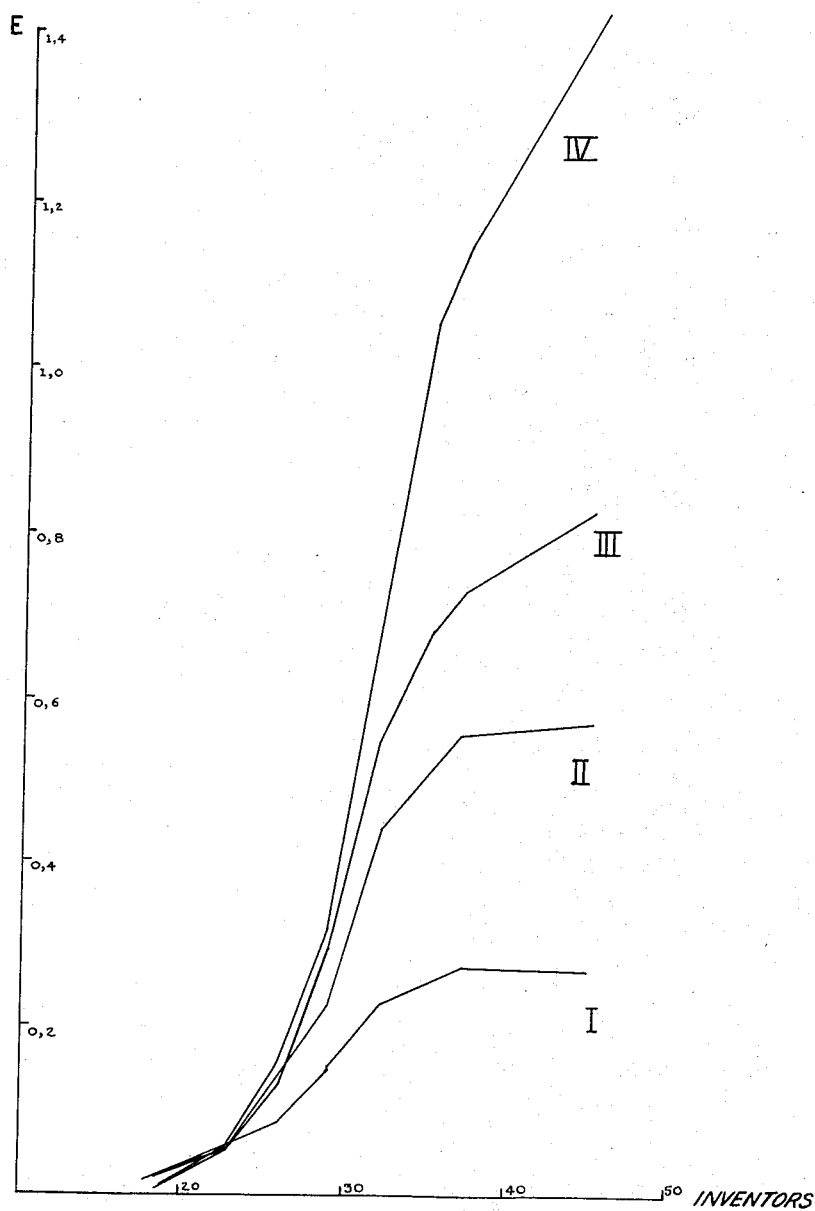

3,118,823
METHOD FOR PRODUCING FERRIOXAMINE
Ernst Gaeumann and Vladimir Prelog, Zurich, Ernst Vischer, Basel, and Hans Bickel, Binningen, Switzerland, assignors to Ciba Corporation, a corporation of Delaware
Filed Nov. 24, 1961, Ser. No. 154,677
Claims priority, application Switzerland Nov. 24, 1960
2 Claims. (Cl. 195—80)

U.S. application Serial No. 57,834, filed September 22, 1960, by Ernst Gaeumann et al., describes new growth-promoting substances, the Ferrioxamines. Inter alia, these substances are obtained by fermentation of Actinomycetes, generally in the form of a mixture of different constituents, for example from *Streptomyces pilosus* Ettlinger et al. NRRL 2857 (ETH 21748) there are obtained the Ferrioxamines A, B, C, $D_1$, $D_2$, E, F and G.

New Actinomycetes strains have now surprisingly been found that produce exclusively Ferrioxamine E. This is of great advantage since the Ferrioxamines are relatively difficult to separate from one another owing to their close relationship. For reasons of accurate dosing and of reproducibility, however, it is desirable to have a unitary compound available for the manufacture of medicaments.

Ferrioxamine E is a compound of the formula

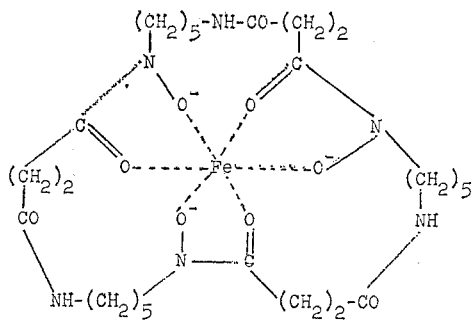

In paper electrophoresis in 0.33 N-acetic acid at 220 volts it covers a distance of 3.9 cm. within 4½ hours (fructose likewise travels 3.9 cm.) The paper-chromatogram in the system n-butanol:glacial acetic acid:water (4:1:5) displays an $R_f$ value of 0.68. On paper impregnated with acetone:water:saturated aqueous sodium chloride solution (6:3:1) in the system tertiary butanol:water:saturated sodium chloride solution: 0.1 N-hydrochloric acid (50:25:25:1)

the $R_f$ value is 0.59. The distribution coefficient in the system n-butanol:benzyl alcohol:water:saturated aqueous sodium chloride solution:0.1 N-hydrochloric acid (200:100:300:60:3)

is 1.593.

Ferrioxamine E has a growth-promoting effect on a variety of micro-organisms and can consequently be used for cultivating these organisms. As an example, the growth-promoting effect of Ferrioxamine E on microbacterium lacticum ATCC 8181 is shown in the figure. On the abscissa the incubation time is given in hours and on the ordinate the extinction of the culture solution. Curve I shows the growth without the addition of Ferrioxamine E (control), Curves II, III and IV the growth with the addition of 10γ/liter, 31.6γ/liter and 100γ/liter respectively of Ferrioxamine E. Furthermore, it has distinct antianaemic properties and is, therefore, suitable for use in the form of preparations as medicaments in human and veterinary medicine.

The new strains producing Ferrioxamine E are *Streptomyces antibioticus* (Waksman et Woodruff) Waksman et Henrici ETH 27083 and *Nocardia brasiliensis* (Lindenberg) Castellani et Chalmers ETH 27413; also strains of the species *Streptomyces albus* (Rossi-Doria amend. Krainsky) Waksman et Henrici such as ETH 24454 and ETH 28481. They are kept in our own laboratories and in the Federal Institute of Technology, Institute for Special Botany, Zurich, under the aforementioned reference numbers. The Streptomyces species which are designated by the numbers ETH 27083, ETH 24454, ETH 28481 and ETH 27413 bear the designations NRRL 2959, NRRL 2960, NRRL 2961 and NRRL 2962, respectively, in the culture collection of the U.S. Department of Agriculture, Northern Utilization Research and Development Division Laboratories, Peoria, Illinois.

*Streptomyces antibioticus* 27083 was isolated from a soil specimen collected in the Gran Chaco of Argentina. The organism has the following characteristics:

(1) The spores are smooth and ellipsoid, measuring 0.7 to 2.2 x 0.4 to 0.8μ; under the electron microscope there are visible numerous degenerate, dumb-bell shape spores which may occur singly or in chains together with healthy spores.

(2) The air mycelium is initially white-grey or brown-grey; in the fully mature state it is ash-grey (cinereous).

(3) The spore chains are monopodially branched, having long, straight or more or less wavy branches; no spirals have been found.

(4) On peptone-containing nutrients melanine formation occurs. The Tresner-Danga reaction (see Tresner and Danga, J. Bacteriol. 76, page 239 [1958]), is positive.

(5) The substrate mycelium is—depending on the individual nutrient used—pale-yellow, yellowish brown, golden yellow to dark brown with a slightly greenish-brown tinge.

To characterise *Streptomyces antibioticus* 27083 further its growth on a variety of nutrients is described below:

The nutrients 1–5 were prepared according to W. Lindenbein, Arch. Mikrobiol. 17, page 361 [1952]; nutrient 6 according to H. D. Tresner and F. Danga, J. Bacteriol. 76, page 239 [1958]; nutrients 7 and 8 according to T. G. Pridham et al., Antibiotics Annual 1956, 1957, page 947; nutrient 10 according to Manual of Methods of Pure Culture Study of Bacteria, Committee on Bacteriological Technic of S. A. B. Biotechn. Publications, Geneva, N.Y., 44–9–10 [1946]; nutrient 9 was made up of 1 gram of tryptone, 1 gram of yeast extract (Difco), 1 gram of meat extract (Oxo Lab. Lemco), 8.5 grams of sodium chloride, 17 grams of agar, 1000 cc. of distilled water.

(1) Synthetic agar: Growth thin, misty to wrinkly, yellowish brown to golden yellow; little dusty, chalk white air mycelium; substratum is not colored.

(2) Glucose-asparagin-agar: Growth thin misty, greenish yellow to olive green; air mycelium dusty or velvety, rarely a little wooly, pale grey or whitish yellow; substratum is not colored.

(3) Gelatine stab (27° C.): Initially pustular, light brown surface growth (pellicules and ring), subsequently basic growth light brown or light yellow; substratum dark brown and gelatine liquefied up to 25 mm. after 10 days; air mycelium absent.

(4) Starch plate: Growth thin, misty, whitish yellow to yellowish brown or light brown; air mycelium dusty, chalk white or milky white; substratum not colored; starch hydrolysis: 2 mm. after 5 days, 5 to 15 mm. after 10 days.

(5) Litmus milk: Initially whitish yellow, subsequently dark brown to bluish black annular growth; air mycelium absent; pH: 8.1 after 5 days and after 10 days.

(6) Peptone-iron-agar: Growth thin, misty, whitish yellow; no air mycelium; very strong positive reaction (medium turns black).
(7) Yeast extract-agar: Growth thin, misty to slightly wrinkly, dark brown; air mycelium velvety, ash grey; substratum turns dark brown.
(8) Carvajal's oatmeal-agar: Growth thin, misty or slightly wrinkly, greenish yellow or light reddish brown; air mycelium velvety or woolly, ash grey; substratum is not colored.
(9) Chromogen-agar: Growth thin, misty or pustular, whitish yellow, with dusty, chalk white air mycelium; substratum turns dark brown (melanine formation).
(10) Nitrate broth: Surface growth and floccular sediment; whitish yellow; occasionally punctiform, bright yellow colonies with little dusty, ash-grey air mycelium in the ring; substratum yellowish brown to pale brown; nitrate reduction rather weak.

*Nocardia brasiliensis* 27413 was isolated from a soil specimen collected in the Society Island Bora-Bora (French Oceania).

Morphologically, the strain is characterized by a strongly branched, wavy substrate mycelium which initially is not segmented and is about 0.6 to $1.1\mu$ wide. Only after a few days—depending on the culture conditions employed—it gives rise to a monopodially branched air mycelium which gradually forms a woolly blanket. The substrate mycelium breaks up into portions varying in length from 1 to $15\mu$ and forms also segmentation spores varying in length from 1.2 to $1.5\mu$; long chains of such segmentation spores were also found in the air mycelium.

None of the species of the genus Nocardia (or, respectively, Proactinomyces Jensen, 1934), mentioned by Waksman (see Bergey's Manual VII, page 713 [1957], and by Krassilnikov (Diagnostik der Bakterien und Actinomyceten, Jena, 1959), is identical with the strain 27413. On the other hand, the strain displays the properties typical of the species *Nocardia brasiliensis* (Lindenberg) Castellani et Chalmers, 1913 (see Gordon et al., J. Bacteriol. 73, page 15 [1957]; Bojalil et al., J. Bacterial. 78, page 852 [1959]; Bojalil et al., Mycopathologia et Mycologia Appl. 11, page 287 [1957]; Burns et al., Mycopathologia et Mycologia Appl. 11, page 297 [1957], and is therefore classed together with said species.

To characterise it further, the growth of *Nocardia brasiliensis* 27413 on various nutrients is described below. The nutrients were prepared in the same manner as described above in connection with the examination of *Streptomyces antibioticus* 27083.

(1) Synthetic agar: Growth initially thin, misty, white-yellow, subsequently slightly wrinkly and pale yellow or yellow-brown; copious air mycelium which is velvety and becomes snow white and woolly towards the end.
(2) Glucose-asparagin-agar: Growth thin, misty, white yellow to pale yellow, subsequently wrinkly and golden yellow. Air mycelium woolly, snow white to partially white-grey.
(3) Gelatine stab (27° C.): Surface growth pale-brown to red-brown. Gelatine is rapidly liquefied (2 cm. in 7 days).
(4) Starch plate: Growth punctiform, pale yellow; hydrolysis after 5 days: 0.9 cm.
(5) Litmus milk: Annular, punctiform growth, colorless to white yellow. Peptonisation and coagulation; pH after 7 days: 7.25.
(6) Peptone-iron-agar: Growth thin, misty, white yellow to pale yellow; negative reaction.
(7) Yeast extract-agar: Growth wrinkly, rarely thin, misty, golden yellow to pale brown; copious woolly air mycelium, snow white to white-yellow.
(8) Carvajal's oatmeal-agar: Growth thin, misty, initially pale brown, subsequently pale yellow-red and finally reddish brown. Woolly air mycelium snow white to whitish yellow.
(9) Chromogen-agar: Thin, misty growth, pale yellow; no melanine formation.
(10) Nitrate broth: Initially sediment flocks and whitish yellow annular growth, subsequently wrinkled pellicules; nitrates are reduced to nitrites.

Strains of the species *Streptomyces albus* that produce Ferrioxamine E are the strains ETH 28481 and ETH 24454. The classification of these strains with the species *Streptomyces albus* is based on the 5 features for the characterization and differentiation of the species recognized by the Stockholm Discussion Group (Stockholm 1958, Küster, 1959):

(1) Spores ellipsoid, measuring 0.6–1.4 x $0.4$–$0.9\mu$; surface smooth, rarely slightly warty.
(2) Air mycelium white, pale whitish yellow or pale whitish grey (niveous).
(3) Spore chains in short, closed (rarely open) spirals which in most cases have 2 to 5 coils; monopodially branched, occasionally in not very distinct whorls.
(4) No melamine formation on nutrients containing peptone, and negative Tresner-Danga reaction.
(5) Substrate mycelium generally whitish yellow to pale yellow, rarely yellowish brown or light brown.

More detailed information concerning the specific characteristics of *Streptomyces albus* will be found in E. Baldacci, Atti Ist. Bot. Pavia Ser. 4, 11, page 191 [1939]; Mycopathologia 2, page 145 [1940]; Duché, Encyclopédie Mycologique 6, Les Actinomyces du Groupe Albus, Paul Lechevalier et Fils, Paris, 1934; R. Hütter, Arch. Mikrobiol. 38, 367 (1961).

Insofar as the manufacture of Ferrioxamine E is concerned, the present invention is not restricted to the use of the four aforementioned strains; it also includes other strains corresponding to the above characterizations as well as variants of said organisms such, for example, as are obtained by selection or mutation, more especially under the action of ultra-violet or X-rays or of nitrogen mustard oils.

Ferrioxamine E is obtained when a strain having the properties of the specified strains is grown in an aqueous nutrient containing a source of carbon and nitrogen and inorganic salts and, if desired, growth-promoting substances, under aerobic conditions until the nutrient displays a substantial Ferrioxamine action, whereupon Ferrioxamine E is isolated therefrom. As assimilable carbon source for growing the aforementioned micro-organisms there are suitable carbohydrates, for example glucose, saccharose, lactose, mannitol, starch and glycerol. As nitrogenous nutrients and, if desired, growth-promoting substances, there may be mentioned: Amino acids and peptides and proteins as well as degradation products thereof such as peptone and tryptone; also meat extracts, water-soluble constituents of cereal grains such as maize and wheat, of distillation radicals from the manufacture of alcohol, of yeast, seeds, more especially rape, soybean, cotton seeds or the like, and also ammonium salts and nitrates. Other inorganic salts which may be present in the nutrient solution are, for example, the chlorides, carbonates and sulfates of alkali metals, alkaline earth metals, magnesium, iron, zinc and manganese.

Cultivation is carried out under aerobic conditions, for example in a quiescent surface culture or preferably submerged, with shaking or stirring with air or oxygen, in shaking bottles or in the known fermenters. The cultivation temperature ranges, for example, from 18 to 40° C. Under these conditions the nutrient displays a substantial Ferrioxamine action in general after 2 to 10 days, whereupon 0.1% of ferric chloride is added to the culture and the mycelium is isolated from the culture filtrate, and the bulk of the Ferrioxamine is then found in the culture filtrate. However, substantial amounts of Ferrioxamine still remain adhering to the mycelium and it is, therefore, of advantage to wash the latter thoroughly, for example with water and/or an aqueous organic solvent such as an alcohol, for example aqueous methanol.

The isolation of Ferrioxamine E from the culture filtrate may follow any one of the known patterns, consisting for example in one or a combination of two or more of the procedures described below:

(1) An adsorbent may be used, for example an active carbon such as Norit, an activated earth such as Franconit, fuller's earth or Floridine, or a resin adsorber such as Asmit. The adsorbate is advantageously eluted with a mixture of a water-miscible organic solvent with water, for example a mixture of water:methanol, water+pyridine, dilute acetic acid+methanol or water+methanol+glacial acetic acid+butanol. Particularly suitable for eluting Franconit or Norit adsorbates is a mixture of 4 parts by volume of water and 1 part by volume of pyridine.

(2) According to another method of isolating Ferrioxamine E it is adsorbed on a cation exchanger; resins containing acid groups, such as Dower 50, are particularly suitable for this purpose. Dowex 50 may be used either in the acid form or in the sodium form; a mixture of these forms has likewise proved advantageous. The elution is advantageously carried out with an acid agent, for example with methanolic hydrochloric acid or an acid buffer solution.

(3) According to another method Ferrioxamine E is extracted from an aqueous solution thereof by means of an organic solvent. Particularly good results have been obtained in such extractions with higher organic alcohols, for example benzyl alcohol or isopropanol. In such extractions it is of advantage to add an inorganic salt, for example ammonium sulfate or sodium chloride, to the aqueous phase. Ferrioxamine E can be obtained in enriched form from the organic extracts thus made, either by evaporating the solvent or by precipitation with a suitable organic solvent, for example ether, petroleum ether or ethyl acetate.

(4) According to another method of enriching Ferrioxamine E it is distributed between an aqueous solution and a solution of phenol in chloroform; in this method both the pH value of the aqueous solution and the phenol content of the chloroform solution may be varied. Taking as the distribution coefficient of Ferrioxamine E the ratio of its concentration in the organic phase to the concentration in the aqueous phase, it is observed that the distribution coefficient rises as the phenol content of the organic phase is increased and drops as the pH value of the aqueous phase is reduced. Since it is thus possible to adjust any desired distribution coefficient of Ferrioxamine E in this system, a large proportion of inactive impurities can be removed by a succession of a few distribution operations.

(5) Another method of enriching and/or separating Ferrioxamine E is chromatography, such as adsorption chromatography on a variety of materials, for example on Norit, alumina, magnesium silicates, silica gel, calcium sulfate; also distribution chromatography with cellulose, starch, silica gel, Celite or the like as vehicle; also chromatography on ion exchange resins, for example on Dowex 50, Amberlite IRC-50, or the like.

(6) Ferrioxamine E can also be enriched by countercurrent distribution according to Craig between two immiscible solvent phases; the following solvent systems have proved particularly suitable for this operation:

(a) Benzyl alcohol:20% aqueous solution of ammonium sulfate.
(b) n-Butanol (100 parts by volume):benzyl alcohol (200 parts by volume):N-hydrochloric acid (6 parts by volume):water (300 parts by volume):aqueous sodium chloride solution saturated at 19° C. (60 parts by volume).

The following examples illustrate the invention:

Example 1

Strain *Nocardia brasiliensis* (Lindenberg) Castellani et Chalmers 27413 is grown in a well aerated submerged culture at 27° C. in a nutrient solution containing per liter of tap water 20 grams of soybean flour (full fat content) and 20 grams of mannitol. The pH value is adjusted to 7.8 with potassium hydroxide. After 6 days 0.1% of ferric chloride is added to the crude cultures and the whole is filtered with the aid of Celite. The culture filtrate is treated with 20 grams of sodium chloride per liter. The clear solution is repeatedly extracted with a mixture of chloroform and phenol (1 cc.:1 gram).

800 mg. of the chloroform+phenol extract (from 1 liter of culture filtrate) are subjected to countercurrent distribution according to Craig with the use of a solvent system consisting of 3 liters of n-butanol, 1.5 liters of benzyl alcohol, 4.5 liters of 0.001 N-hydrochloric acid and 0.9 liter of saturated aqueous sodium chloride solution. The substance is introduced into the first two glasses of the apparatus and distribution over 60 stages is performed. In fractions 0 to 2 and 51 to 60 brown, inactive impurities collect, while a unitary red zone develops having its maximum in stage 37. Colorimetric evaluation at 430 m$\mu$ gives a curve corresponding to a unitary compound. In stages 25 to 45 (maximum in stages 36–39) an anti-Sideromycin activity is revealed by the modified Bonifas test.

The distribution maximum corresponds to a distribution coefficient $K=1.593$.

Fractions 30 to 43 of the distribution are combined. The bottom phase is separated and washed twice with ether. The supernatant phase is treated with ether and extracted three times with water. The extracts are washed with ether and combined with the previously separated bottom phase.

The combined extracts are then saturated with sodium chloride and extracted with a 1:1-mixture of phenol and chloroform. The extract is dried with sodium sulfate, mixed with three times its own volume of ether and agitated three times with water, whereupon reddish brown Ferrioxamine E passes completely into the aqueous phase. From the latter substantially pure Ferrioxamine E can be isolated by evaporation in vacuum. The residue is dissolved in about 20 cc. of hot methanol and concentrated by evaporation to 4–5 cc. When the concentrate is left to itself in the cold, pure Ferrioxamine E crystallizes in very fine small needles of reddish-brown gloss which lose their double refraction at 280° C. and undergo charring (without melting) on prolonged heating. The yield amounts to 28 mg.

Example 2

Strain *Streptomyces antibioticus* (Waksman et Woodruff) Waksman et Henrici 27083 is grown in a well aerated submerged culture at a temperature of 27° C. in a nutrient solution containing per liter 20 grams of rape extraction shucks and 20 grams of malt extract. The pH value is adjusted to 7.5 by means of potassium hydroxide. After 6 days 0.1% of ferric chloride is added to the crude culture and the whole is filtered through Celite. The culture liquor is then worked up as described in Example 1; it contains no Ferrioxamines other than Ferrioxamine E which is isolated as described in Example 1.

Example 3

Strain *Streptomyces albus* (Rossi-Doria emend. Krainsky) Waksman et Henrici ETH 28481 is grown in a well aerated submerged culture at a temperature of 27° C. in a nutrient solution containing per liter 20 grams of glucose, 5 grams of l-asparagin, 1 gram of magnesium sulfate, 0.5 gram of calcium chloride and 1 gram of secondary potassium phosphate. After 8 days, 0.1% of ferric chloride is added to the crude culture and the whole is filtered through Celite. The culture liquor is then worked up as described in example; it contains no Ferrioxamines other than Ferrioxamine E which is isolated as described in Example 1.

In an analogous manner Ferrioxamine E is obtained by growing *Streptomyces albus* (Rossi-Doria emend. Krainsky) Waksman et Henrici ETH 24454 or *Streptomyces antibioticus* (Waksman et Woodruff) Waksman et Henrici ETH 27083 or *Nocardia brasiliensis* (Lindenberg) Castellani et Chalmers ETH 27413 on the above synthetic nutrient solution.

What is claimed is:

1. Process for the manufacture of a growth-promoting substance, wherein a member selected from the group consisting of a strain of the species *Streptomyces antibioticus* ETH 27083, *Nocardia brasiliensis* ETH 27413, *Streptomyces albus* ETH 24454 and ETH 28481 and a Ferrioxamine E-forming mutation of these strains is grown in a nutrient solution containing a source of carbon and nitrogen and inorganic salts, and Ferrioxamine E is isolated.

2. Process as claimed in claim 1, wherein cultivation is carried on for 36 to 150 hours at a temperature ranging from 18 to 40° C., preferably at 27° C.

References Cited in the file of this patent

UNITED STATES PATENTS

| | | |
|---|---|---|
| 2,422,230 | Poster | June 17, 1947 |
| 2,541,726 | Trussell | Feb. 13, 1951 |